United States Patent
Rao et al.

[15] 3,682,954
[45] Aug. 8, 1972

[54] BIS (3-PYRAZOLIDONE) COMPOUNDS

[72] Inventors: Durvasula V. Rao, Hamden, Conn. 06514; Adnan A. R. Sayigh, North Haven, Conn. 06473; Henri Ulrich, Northford, Conn. 06472

[73] Assignee: The Upjohn Company, Kalamazoo, Mich.

[22] Filed: Feb. 4, 1970

[21] Appl. No.: 8,712

[52] U.S. Cl. ........260/310 A, 96/66 HD, 260/2.5 AS, 260/2.5 AM, 260/13, 260/77.5 AM, 260/77.5 CH, 260/77.5 SP, 260/141, 260/559 H, 260/562 H, 260/569, 260/824
[51] Int. Cl. ...............................................C07d 49/04
[58] Field of Search..................................260/310 A

[56] References Cited

UNITED STATES PATENTS

| | | |
|---|---|---|
| 2,743,279 | 4/1956 | Reynolds et al. .......260/310 A |
| 2,903,462 | 9/1959 | Schmidt-Nickels et al........................260/310 A |

FOREIGN PATENTS OR APPLICATIONS

| | | |
|---|---|---|
| 179,774 | 4/1966 | U.S.S.R. ................260/310 A |
| 264,287 | 8/1912 | Germany...............260/310 A |

OTHER PUBLICATIONS

Wiley et al. Pyrazolones, Pyrazolidones and Derivatives, pages 118– 119. N.Y., Interscience-Wiley, 1964. QD401.W5

*Primary Examiner*—Natalie Trousof
*Attorney*—Stewart & Steward, Merrill F. Steward, Donald T. Steward and Walter D. Hunter

[57] ABSTRACT

4,4'-di-(3-oxo-1-pyrazolidino)-diphenylmethane compounds are prepared by heating the corresponding di-(N-$\beta$-hydrozypropio)-4,4'-dihydrazidodiphenylmethane compositions in an inert organic solvent and in the presence of an acid dehydration catalyst. Valuable polyureas and mixed polyurethane-polyurea products are formed by reacting a polyisocyanate with these compounds or with mixtures of the novel compounds and conventional polyols.

6 Claims, No Drawings

BIS (3-PYRAZOLIDONE) COMPOUNDS

BACKGROUND OF THE INVENTION

1. Field of the Invention

This invention relates to bis (3-pyrazolidone) derivatives and to a method for their preparation. More particularly, this invention is concerned with 4,4'-di-(3-oxo-1-pyrazolidino)-diphenylmethane compounds and to di-(N-β-hydroxypropio)-4,4'-dihydrazidodiphenylmethane compositions which are intermediates therefor, and to methods for preparing such compounds.

2. Description of the Prior Art

A number of 3-pyrazolidone derivatives have been prepared, such as those described in U.S. Pat. No. 2,743,279, which include 1-phenyl-3-pyrazolidone, 1-p-tolyl-3-pyrazolidone, bis-4 (3-oxo-1-pyrazolidino)-benzyl ether, etc. Various 3-pyrazolidones have been synthesized by the method set forth in U.S. Pat. No. 2,289,367 in which hydrazine hydrate is reacted with an α,β-olefin carboxylic acid. Hydrolysis of pyrazolines yields 3-pyrazolidones as set forth in British Pat. No. 679,677. The 4,4'-di-(3-oxo-1-pyrazolidino)-diphenylmethane compounds and the novel intermediates from which they are prepared exhibit highly useful and unique properties not possessed by the known bis(3-pyrazolidone) derivatives.

SUMMARY OF THE INVENTION

This invention relates to novel compounds of the formula:

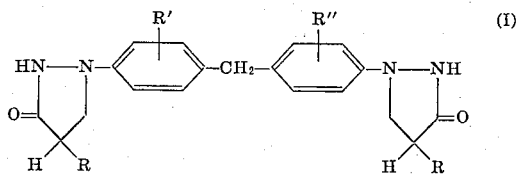

wherein R is selected from the group consisting of hydrogen, lower alkyl, and aryl of not more than 10 carbon atoms, and R' and R'' are independently selected from the group consisting of hydrogen, lower alkyl, lower alkoxy, lower alkylthio, and halogen.

The present invention, in another aspect, relates to novel compositions of the formula:

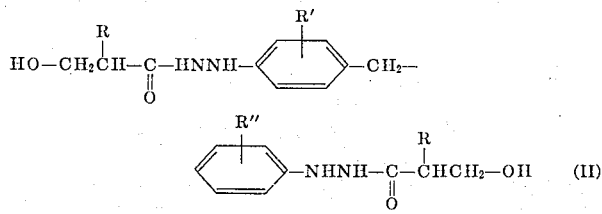

wherein R, R' and R'' have the same meaning as described above. Dihydrazidodiphenylmethane compositions (II) are employed as intermediates in preparing the above-mentioned novel 4,4'-di-(3-oxo-1-pyrazolidino)-diphenylmethane compounds (I).

In this specification the phrase "aryl of not more than 10 carbon atoms" means phenyl, ethylphenyl, isobutylphenyl, tolyl, n-propyltolyl, xylyl, ethylxylyl, etc. and isomeric forms thereof and the term "lower alkyl" means alkyl from one to eight inclusive carbon atoms as exemplified by methyl, ethyl, propyl, butyl, pentyl, hexyl, heptyl, octyl and isomeric forms thereof. Lower alkoxy in this specification means alkoxy of from one to six inclusive carbon atoms, such as ethoxy, propoxy, pentyloxy, hexyloxy, etc., while the term "lower alkylthio" throughout this specification means alkylthio of from one to eight inclusive carbon atoms, such as methylthio, ethylthio, propylthio, butylthio, pentylthio, hexylthio, heptylthio, octylthio and isomers thereof. Useful halogen substituents include fluorine, chlorine, bromine and iodine.

The bis (3-pyrazolidone) compounds (I) of this invention are useful as developing agents for photographic silver halide emulsions. These compounds as well as the dihydrazidodiphenyl-methane compositions from which they are prepared can be employed as a substitute for a part or all of the polyamine reactant in the formation of polyureas by interaction of a diisocyanate and a polyamine. In a like manner, highly useful mixed polyurethane-polyurea products can be made by reacting a polyisocyanate with a polyol mixture comprising a polyol and a portion of one or more of the bis (3-pyrazolidone) compounds (I) or dihydrazidodiphenylmethane compositions (II) of this invention. Processes for synthesizing these polyureas and mixed polyurethane-polyurea products as foams, fibers, and coatings are well-known in the art. The products obtained using the novel compositions of this invention, that is, the polyureas and mixed polyurethane-polyureas, exhibit outstanding physical properties and improved dyeability. Further, the novel dihydrazidodiphenylmethane compositions (II), being tetrafunctional, are valuable cross-linking materials for polyurethane and polyurea products.

DETAILED DESCRIPTION OF THE INVENTION

The novel 4,4'-di-(3-oxo-1-pyrazolidino)-diphenylmethane compounds (I) are prepared by heating the corresponding di-(N-β-hydroxypropio)-4,4'-dihydrazidodiphenylmethane compositions (II) in an inert organic solvent and in the presence of an acid dehydration catalyst. The reaction is conveniently conducted at a temperature ranging from about 80° C. to about 130° C. and, preferably, at a temperature of from about 100° C. to about 120° C. Useful dehydration catalysts include, for example, any of the substantially non-volatile, strong inorganic acids such as hydrochloric acid, sulfuric acid, p-toluenesulfonic acid and methanesulfonic acid. The quantity of the dehydration catalyst employed, which is not critical, can be varied over a wide range and generally will be from about 0.01 to about 5 mole or more of the dehydration catalyst per mole of the starting dihydrazidodiphenylmethane composition (II) employed. Illustrative of the inert organic solvents which may be employed are benzene, toluene, xylene, naphthalene, decalin, chlorobenzene, o-dichlorobenzene, bromobenzene, o-chlorotoluene and the like. The amount of the inert organic solvent employed can be varied over a wide range and generally the amount utilized is such that the reactants present represent from about 1 to about 20 percent by weight of the reaction mixture. The time required to carry out the dehydration reaction will, of course, vary widely depending upon reaction temperature selected as well as the other operating conditions employed. The resulting 4,4'-di-(3-oxo-1-pyrazolidino)-diphenylmethane compound an be recovered from the reaction mixture by a variety of methods well-known in the art. For example, the solvent can be evaporated to completion yielding the product in solid form or the reaction mixture may be first cooled and then a portion of the solvent evaporated to yield the product as a precipitate which can then be recovered by filtration, decantation, centrifugation, or by another convenient method.

The di-(N-β-hydroxypropio)-4,4'-dihydrazidodiphenyl-methane compositions (II) which, as previously set forth, are novel compositions themselves falling within the scope of this invention as well as being intermediates utilized in synthesizing the corresponding pyrazolidone compounds, are conveniently prepared according to the process of this invention by reacting a 4,4'-dihydrazinodiphenylmethane compound of the formula:

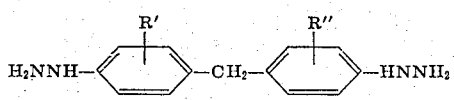

wherein R' and R" have the same significance as previously described, in the presence of an inert organic solvent with a propiolactone of the formula:

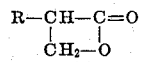

wherein R has the same meaning as hereinbefore described. Advantageously, the reaction is carried out at an elevated temperature which generally will be from about 50° C. to about 100° C. and preferably will be from about 60° C. to about 70° C. It has been found that the reaction can be carried out in an extremely convenient manner by refluxing the ingredients in the inert organic solvent. Useful inert organic solvents include compounds such as tetrahydrofuran, dioxane, chloroform and ethyl acetate. The quantity of the inert organic solvent employed is not critical although, generally, the amount of the solvent utilized is such that the reactants represent about 5 to about 25 percent by weight of the reaction mixture. Usually, approximately stoichiometric proportions of the two reactants are employed but, if desired, an excess of the propiolactone may be utilized in order to improve the yield. Recovery of the product can be accomplished by conventional procedures. For example, the product can be recovered by extraction with a suitable liquid solvent from which the product can be isolated by evaporation of the solvent from the extract phase. Also, the reaction mixture can be cooled and after a portion of the solvent is evaporated the product which precipitates can be conveniently recovered by filtration, decantation or by any other convenient method.

The dihydrazino derivatives employed as starting materials in the preparation of the dihydrazidophenylmethane compounds (II) of this invention can be represented by the general formula:

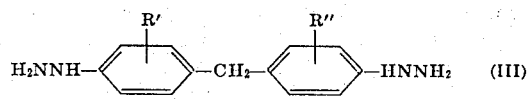

These compounds (III) can be prepared by procedures well-known in the art. For example, such dihydrazidodipehnylmethane compounds (III) can be synthesized by (a) treating the corresponding 4,4'-methylenedianiline

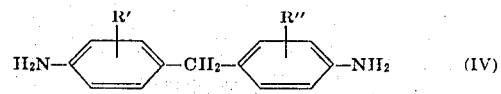

with concentrated hydrochloric acid to form the hydrochloride salt thereof followed by treatment with a solution of sodium nitrite to give the tetraazo derivative of the formula:

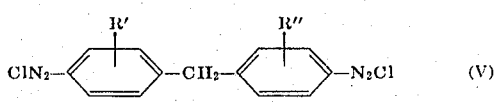

(b) reacting the thus-formed tetraazo derivative (V) with a solution of sodium bisulfite to first form the corresponding bis-diazosulfonate of the formula:

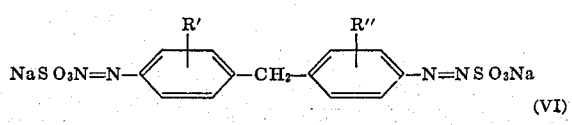

which is reduced by the action of the sodium bisulfite solution to yield the corresponding bis-hydrazine-N-sulfonate of the formula:

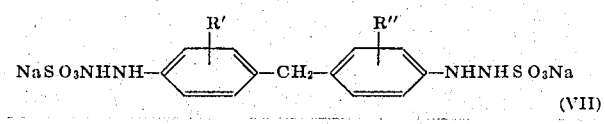

and (c) treatment of the bis-hydrazine-N-sulfonate (VII) with hydrochloric acid gives the 4,4'-dihydrazinodiphenylmethane dihydrochloride having the formula:

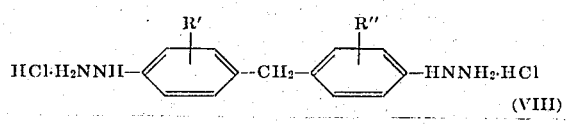

following which the desired dihydrazinodiphenylmethane (III) is formed by treating the dihydrochloride salt (VIII) with a solution of sodium acetate trihydrate and by adding sodium hydroxide to form a basic solution. In compounds III through VIII above, R and R' are as hereinbefore defined. Methylenedianiline compounds (IV) are well-known materials prepared by the interaction of formaldehyde, hydrochloric acid and the requisite aniline derivative by the method, for example, set forth in Seeger et al. U.S. Pat. No. 2,683,730.

The production of polyureas or mixed polyurethane-polyurea products in the form of fibers, foams or coatings utilizing the novel compounds of this invention is conducted in accordance with operating procedures which are well-known in the art: see, for example, Sorenson et al., *Preparative Methods of Polymer Chemistry*, Interscience Publishers, New York, 1968, pp. 107–130, and Saunders et al., *Polyurethanes, Chemistry and Technology*, Part I, Interscience Publishers, New York, 1962.

Highly valuable polyureas and mixed polyurethane-polyurea products can be prepared utilizing the novel compositions of this invention by reaction with a wide variety of conventionally employed polyisocyanates or by reaction of, for example, a mixture comprising a polyol and about 5 to about 85 percent by weight or more, based on the weight of the mixture, of at least one of the novel bis (3-pyrazolidone) compounds (I) or the novel dihydrazidodiphenylmethanes (II) previously described with a polyisocyanate. Catalysts, blowing agents, surfactants, cell-openers, etc., of the type commonly employed in the art may be added to the reaction mixture, as required, in preparing such polyurea and mixed polyurethane-polyurea products.

Examples of polyols which can be employed in combination with the novel compositions of this invention include:

a. aliphatic diols, such as ethylene glycol, 1,2-propylene glycol, 1,3-propanediol, 1,4-butanediol, 1,5-pentanediol, 1,2-hexanediol, etc.;

b. aliphatic triols, such as trimethylolmethane, trimethylolethane, trimethylolpropane; 1,2,3-hexanetriol, 1,1,1-trimethylolhexane, etc.;

c. aliphatic tetrols, such as erythritol, pentaerythritol, etc.;

d. aliphatic pentols, such as arabitol, xylitol, etc.;

e. aliphatic hexols, such as mannitol, sorbitol, dipentaerythritol, etc.; and f. aniline-alkylene oxide diol adducts having a molecular weight from about 60 to about 400 such as the adducts of aniline with ethylene oxide, propylene oxide, 1,2-butylene oxide, and the like. Also, polyol adducts prepared by reacting one or more moles of ethylene oxide, propylene oxide, or 1,2-butylene oxide with (a), (b), (c), (d) or (e) above in the presence of an alkali metal hydroxide catalyst may be employed.

Any of the prior art polyisocyanates can be used as reactants in preparing polyureas or mixed polyurethane-polyureas with the compounds of this invention, e.g., 2,4-tolyene diisocyanate, 2,6-tolylene diisocyanate, 4,4' diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann.562, 122–135 (1949). A preferred group of polyisocyanates includes products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. These polyisocyanates are known in the art and are described in U.S. Pat. Nos. 2,683,730; 2,950,263; and 3,012,008.

In preparing polyureas the solid compositions of this invention are conveniently reacted with the polyisocyanate in the presence of an inert organic solvent as exemplified by benzene, toluene, xylene, chlorobenzene, o-dichlorobenzene, etc.

The enhanced dyeability characteristics exhibited by the polyureas and mixed polyurethane-polyureas products prepared using the novel compounds (I) and (II) of this invention are believed to be attributable to the:

groups present which are sufficiently basic in nature to provide sites for the attachment of acid dyestuff molecules.

The following examples illustrate various embodiments of the invention and are to be considered not limitative.

EXAMPLE I di-(N-β-hydroxypropio)-4,4'-dihydrazidodiphenylmethane

To 4.56g. of 4,4'-dihydrazinodiphenylmethane dissolved in 100ml. of tetrahydrofuran 3ml. of β-propiolactone, dissolved in 15ml. of tetrahydrofuran, was added and dispersed under nitrogen over a period of 60 minutes at a temperature of 65° C. After refluxing for an additional 4 hour period and then cooling there was obtained as a precipitate, 4.0g. (47 percent of the theoretical yield) of di-(N-β-hydroxypropio)-4,4'-dihydrazidodiphenylmethane of the formula:

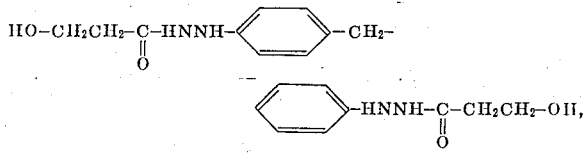

and having a melting point of 164°–165° C. after recrystallization from methanol.

Analysis — Calc'd. for $C_{19}H_{24}N_4O_4$: C, 61.27; H, 6.48; N, 15.05. Found: C, 60.04; H, 6.48; N, 14.38.

EXAMPLE II

Using the method of Example I but replacing 4,4'-dihydra-zinodiphenylmethane by:

a. 3-methyl-3'-chloro-4,4'-dihydrazinodiphenylmethane, b. 2-ethylthio-3'-phenyl-4,4'-dihydrazinodiphenylmethane, or, c. 2,2'-di-n-propoxy-4,4'-dihydrazinodiphenylmethane, there are obtained in comparable yield, d. di-(N-β-hydroxypropio)-3-methyl-3'-chloro-4,4'-dihydrazinodiphenylmethane of the formula:

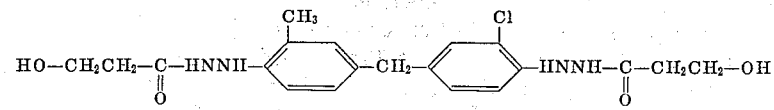

(e) Di-(N-β-hydroxypropio)-2-ethylthio-3'-phenyl-4,4'-dihydrazinodiphenylmethane of the formula:

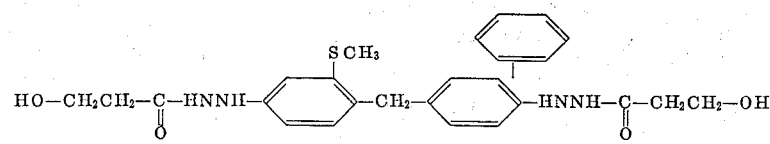

and (f) Di-(N-β-hydroxypropio)-2,2'-di-n-propoxy-4,4'-dihydrazinodiphenylmethane of the formula:

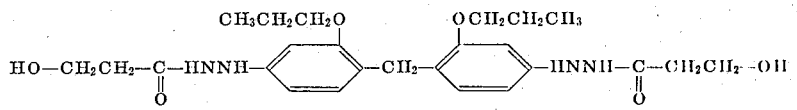

respectively. These starting materials can be reacted in the manner set forth in Example IV to provide the corresponding bis (3-pyrazolidone) derivatives.

EXAMPLE III

Utilizing the same procedure as set forth in Example I with the exception that the β-propiolacetone is replaced with (a) 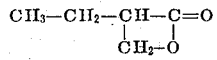

(b) 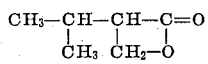

(c) 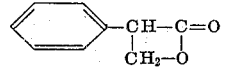

or (d) 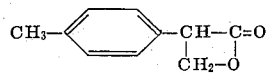

there are obtained in comparable yield:

(e) 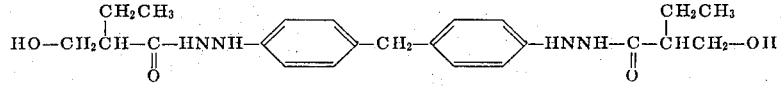

(f) 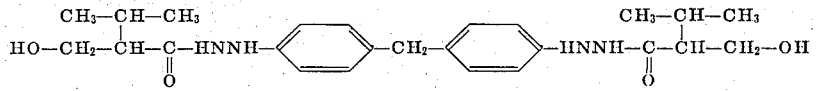

(g) 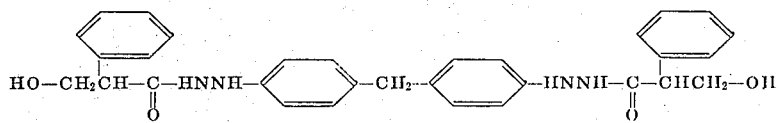

and (h) 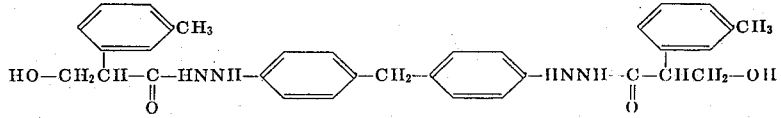

respectively.

EXAMPLE IV 4,4'-di(3-oxo-1-pyrazolidino)-diphenylmethane

To a solution of 10g. of di-(N-β-hydroxypropio)-4,4'-dihydrazidodiphenylmethane in 500ml. of chlorobenzene 2g. of p-toluenesulfonic acid was added and the resulting mixture refluxed for 4 hours. On cooling and after partial evaporation of the solvent there was recovered by filtration 8.5g. (94.5 percent of the theoretical yield) of 4,4'-di-(3-oxo-1-pyrazolidino)-diphenylmethane of the formula:

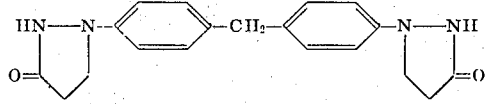

and having a melting point of 240°–246° C. after recrystallization from chlorobenzene.

Analysis — Calc'd. for $C_{19}H_{20}N_4O_2$: C, 67.84; H, 5.99; N, 16.66. Found: C, 67.77; H, 6.07; N, 16.56.

EXAMPLE V

Following the procedure of Example IV but substituting for di-(N-β-hydroxypropio)-4,4'-dihydrazidodiphenylmethane:

a. di-(Nα-ethyl-β-hydroxypropio)-4,4'-dihydrazidodiphenylmethane, b. di-(Nα-isopropyl-β-hydroxypropio)-4,4'-dihydrazidodiphenylmethane, c. di-(Nα-phenyl-β-hydroxypropio)-4,4'-dihydrazidodiphenylmethane, or d. di-(Nα-tolyl-β-hydroxypropio)-4,4'-dihydrazidodiphenylmethane, there are produced in comparable yield:

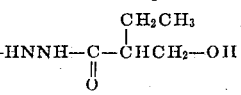

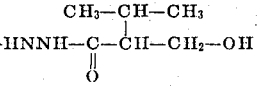

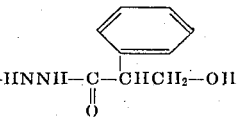

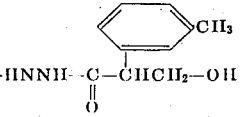

(e) 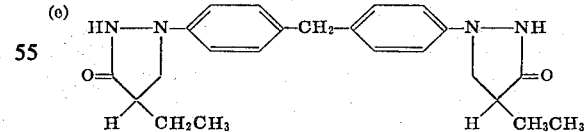

(f) 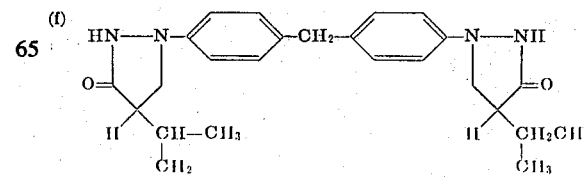

(g)

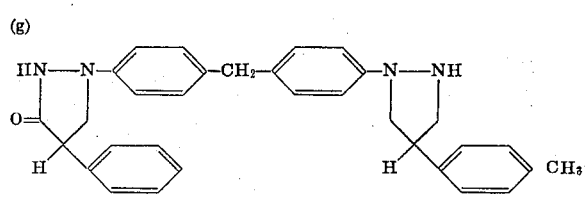

and
(h)

respectively.

EXAMPLE VI

Mixed Polyurethane-Polyurea Foamed Product

A total of 90 parts by weight of a polyol blend formulated by mixing 94 parts by weight of a methyl glucoside-propylene oxide polyol adduct (equivalent weight=129), and 15 parts by weight of 4,4'-di-(3-oxo-1-pyrazolidino)-diphenylmethane, 2 parts by weight of a water soluble silicone-glycol copolymer cell control agent and stabilizer, and 40 parts by weight of Freon 11-B (a stabilized trichloromonofluoromethane which is the last material added), are mixed together with a mechanical blender. To the resulting mixture there is added rapidly 133 parts by weight of PAPI (polymethylene polyphenyl isocyanate of equivalent weight 133) and the mixture thus-obtained is stirred with a high speed stirrer for about 40 seconds and then is poured into an open mold. The resulting mixed polyurethane-polyurea foam is allowed to rise freely in the mold and after being cured for 7 days at about 20° C. the result is a foamed product characterized by high compressive strength and excellent dyeability.

The foamed product contains urea linkages of the following type:

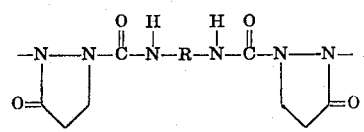

where the polymethylene polyphenyl isocyanate reactant is represented as OCN—R—NCO.

In a like manner the novel dihydrazidodiphenylmethane compositions (II) can be utilized in preparing valuable mixed polyurethane-polyurea products which are cross-linked materials possessing a high degree of dyeability and high compression strength.

What is claimed is:

1. A compound having the formula:

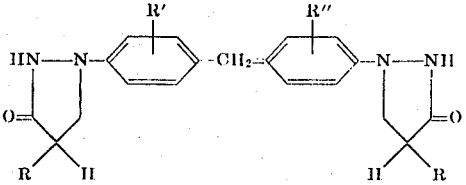

where R is selected from the group consisting of lower alkyl of from two to eight carbon atoms and (lower alkyl)$_n$-phenyl of not more than 10 carbon atoms, wherein $n$ is an integer of from 0 to 3 inclusive; and R' and R" are independently selected from the group consisting of hydrogen, lower alkyl, lower alkoxy, lower alkylthio and halogen.

2. A compound of claim 1 wherein R is (lower alkyl)$_n$-phenyl, where $n$ is an integer of from 0 to 3 inclusive.

3. A compound of claim 1 wherein R is ethyl and R' and R" are each hydrogen.

4. A compound of claim 1 wherein R is isopropyl and R' and R" are each hydrogen.

5. A compound of claim 1 wherein R is phenyl and R' and R" are each hydrogen.

6. A compound of claim 1 wherein R is p-tolyl and R' and R" are each hydrogen.

* * * * *